US009106548B2

(12) United States Patent
Johnsson et al.

(10) Patent No.: US 9,106,548 B2
(45) Date of Patent: Aug. 11, 2015

(54) NETWORK FAULT LOCALIZATION

(75) Inventors: Andreas Johnsson, Uppsala (SE);
Catalin Meirosu, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 189 days.

(21) Appl. No.: 13/609,841

(22) Filed: Sep. 11, 2012

(65) Prior Publication Data

US 2014/0071832 A1 Mar. 13, 2014

(51) Int. Cl.
| H04L 12/26 | (2006.01) |
| H04L 12/24 | (2006.01) |
| H04L 12/721 | (2013.01) |
| H04L 12/703 | (2013.01) |

(52) U.S. Cl.
CPC ............ H04L 43/10 (2013.01); H04L 41/0677 (2013.01); H04L 45/28 (2013.01); H04L 45/70 (2013.01); H04L 41/12 (2013.01)

(58) Field of Classification Search
CPC .................... H04W 52/0232; H04W 52/0242; H04W 52/26; H04W 40/02; H04W 40/12; H04W 40/14; H04W 40/30
USPC .......................................................... 370/242
See application file for complete search history.

(56) References Cited

U.S. PATENT DOCUMENTS

| 7,489,639 | B2 * | 2/2009 | Breitgand et al. ............ 370/241 |
| 7,606,895 | B1 | 10/2009 | Dini et al. |
| 2005/0262233 | A1 * | 11/2005 | Alon et al. ..................... 709/223 |
| 2006/0052921 | A1 | 3/2006 | Bodin et al. |
| 2007/0140128 | A1 * | 6/2007 | Klinker et al. ................. 370/238 |
| 2008/0075080 | A1 * | 3/2008 | Katabi et al. .................. 370/392 |
| 2008/0080376 | A1 * | 4/2008 | Adhikari et al. .............. 370/231 |
| 2011/0243279 | A1 * | 10/2011 | Thian et al. .................... 375/340 |
| 2012/0127875 | A1 * | 5/2012 | Zhao ............................. 370/252 |
| 2013/0051252 | A1 * | 2/2013 | Ciavattone et al. ........... 370/252 |

OTHER PUBLICATIONS

"Cisco IOS IP SLAs configuration guide," Cisco Systems, Inc., Release 12.4, 2008, 271 pages.
"Cisco IOS IP SLAs Overview," Cisco Systems, Dec. 8, 2005, 12 pages.
Yao, L. et al. "Particle filtering based availability prediction for web services," ICSOC, 2011, pp. 566-573.
Zseby, T. et al., "Deployment of sampling methods for SLA validation with non-intrusive measurements," 2002, 11 pages.
Koutsoukos, X. et al., "Monitoring and diagnosis of hybrid systems using particle filtering methods," 2002, 15 pages.

(Continued)

*Primary Examiner* — Omar Ghowrwal
*Assistant Examiner* — Ellen A Kirillova
(74) *Attorney, Agent, or Firm* — Withrow & Terranova, PLLC (57) ABSTRACT

Mechanisms for monitoring communication links in a network are disclosed. A device receives a plurality of path performance indicators over a period of time. It is determined that at least some of the path performance indicators identify a path violation in a corresponding path of a plurality of paths in the network. For each path performance indicator that identifies a path violation, a communication link value associated with each communication link in the corresponding path is updated based on a path violation value. The device identifies at least one particular communication link as a problematic communication link based on a comparison between a problematic link criterion and the communication link value associated with the at least one particular communication link.

26 Claims, 9 Drawing Sheets

(56) References Cited

OTHER PUBLICATIONS

Hedayat, K. et al., "A Two-Way Active Measurement Protocol (TWAMP)," IETF, RFC 5357, Oct. 2008, 52 pages.

Postel, J., "Internet Control Message Protocol," IETF,RFC 792, Sep. 1981, 22 pages.

"OAM functions and mechanisms for Ethernet based networks," Recommendation ITU-T, G.8013/Y.1731, Jul. 2011, 92 pages.

Baillargeon, S. et al., "Ericsson TWAMP value-added octets," draft-ietf-ippm-twamp-value-added-octets-05.txt, Jul. 19, 2012, 2 pages.

Case, J. et al., "Simple Network Management Protocol," IETF, RFC 1157, May 1990, 72 pages.

"Resource Reservation Protocol," Wikipedia, published at least as early as May 5, 2010, 6 pages, http://en.wikipedia.org/wiki/Resource_reservation_protocol.

"RSVP-Traffic Engineering (RSVP-TE)," Wikipedia, page last modified Nov. 8, 2010, 3 pages, http://en.wikipedia.org/wiki/RSVP-TE.

"Netflow," Wikipedia, published at least as early as Feb. 9, 2010, 6 pages, http://en.wikipedia.org/wiki/Netflow.

"Sflow," Wikipedia, published at least as early as Jan. 25, 2010, 3 pages, http://en.wikipedia.org/wiki/SFlow.

"Simple Network Management Protocol," Wikipedia, published at least as early as Aug. 30, 2012, 10 pages, http://en.wikipedia.org/wiki Simple_Network_Management_Protocol.

Ed, I. et al., "Operations, Administration, and Maintenance Framework for MPLS-Based Transport Networks," RFC 6371, Sep. 2011, 124 pages.

Shalunov, S. et al., "A One-Way Active Measurement Protocol (OWAMP)," RFC 4656, Sep. 2006, 112 pages.

Doucet, A. et al., "A tutorial on particle filtering and smoothing: fifteen years later," Technical report, Department of Statistics, University of British Columbia, Dec. 2008, 39 pages.

Blanton, E. et al., "A Framework for an On-Demand Measurement Service," 2008, 16 pages, http://www.cs.purdue.edu/homes/fahmy/reports/measurement.pdf.

Boote, J. et al., "Instantiating a Global Network Measurement Framework," LBNL Technical Report LBNL-1452E, Jan. 2009, 10 pages, http://acs.lbl.gov/~tierney/papers/perfsonar-LBNL-report.pdf.

Varga, P. et al., "Integration of Service-Level Monitoring with Fault Management for End-to-End Multi-Provider Ethernet Services," IEEE Transactions on Network and Service Management, vol. 4, No. 1, Jun. 2007, pp. 28-38.

Steinert, R. et al., "Long-term adaptation and distributed detection of local network changes," IEEE GLOBECOM, Dec. 2010, 5 pages.

Rizzo, T. et al., "High quality queueing information from accelerated active network tomography," 4th International Conference on Testbeds and research infrastructures for the development of networks & communities, Mar. 2008, 10 pages.

Hoque, R. et al., "A self-organizing scalable network tomography control protocol for active measurement methods," International Symposium on Performance Evaluation of Computer and Telecommunication Systems (SPECTS), Ottawa, Jul. 2010, 8 pages.

"Internet protocol data communication service—IP packet transfer and availability performance parameters," ITU-T Recommendation Y.1540, Mar. 2011, 52 pages.

* cited by examiner

NETWORK FAULT LOCALIZATION

TECHNICAL FIELD

The embodiments disclosed herein relate to localizing faults in a communications network.

BACKGROUND

A network may include multiple network nodes, such as routers, switches and the like, and communication links that connect the network nodes to one another. A path through the network from one endpoint to another endpoint may traverse a number of the communication links. Many of the communication links may participate in multiple paths.

Preferably, a communication link that is experiencing a problem is identified sooner rather than later in order to minimize any negative consequences to users of the network. However, fault localization in a network with even a moderate number of communication links can be difficult.

Some network fault localization techniques collect information over a period of time, and provide such information to a central node for offline determination of faults. However, it is preferable to be able to localize faults in real-time to minimize network disruption.

Some mechanisms utilize a combination of ping and traceroute functionality to determine a location of a fault in a network. However, an ability to respond to a traceroute query requires support from intermediary nodes along a path, and not all nodes may implement such functionality. Moreover, such functionality typically requires parameter configuration, and thus includes management overhead. Accordingly, there is a need for more robust network fault localization mechanisms.

SUMMARY

Embodiments disclosed herein relate to fault localization in a network. In one embodiment, a method of monitoring a network is provided wherein a plurality of path performance indicators is received over a period of time. It is determined that at least some of the path performance indicators identify a path violation in a corresponding path of a plurality of paths in the network. Each path in the network comprises at least one communication link. For each path performance indicator that identifies a path violation, a communication link value associated with each communication link in the corresponding path of the plurality of paths is updated based on a path violation value. At least one particular communication link is identified as a problematic communication link based on a comparison between a problematic link criterion and the communication link values. Among other advantages, some embodiments localize faults in real-time as path performance indicators are received, facilitating relatively fast and automated identification of problematic communication links.

According to another embodiment, a device for monitoring a plurality of communication links is provided. The device includes a communications interface configured to communicate via a network, and a processor coupled to the communications interface. The processor is configured to receive a plurality of path performance indicators over a period of time, and determine that at least some of the path performance indicators identify a path violation in a corresponding path of the network. For each path performance indicator that identifies a path violation, the device updates a communication link value associated with the communication link in the corresponding path based on a path violation value. The device identifies at least one particular communication link as a problematic communication link based on a comparison between a problematic link criterion and the communication link values. Among other advantages, the fault localization mechanisms disclosed herein scale well with large network environments having many communication links.

In yet another embodiment, a method of monitoring a plurality of communication links is provided, wherein each communication link has an associated probability that the communication link is a problematic communication link. Each communication link in the network is initialized to have a same associated probability. A plurality of path performance indicators is received over a period of time. For each received path performance indicator, it is determined if the path performance indicator identifies a path violation in a corresponding path. If the path performance indicator identifies a path violation, then the probability associated with each communication link in the corresponding path is increased, and the probability associated with each communication link not in the corresponding path is decreased. If the path performance indicator does not identify a path violation then the probability associated with each communication link in the network is decreased. The probabilities of all the communication links in the network are normalized, and at least one communication link is identified as a problematic communication link based on a determination that the probability associated with the at least one communication link is higher than a threshold probability. Among other advantages, embodiments illustrated herein may reduce the number of measurements needed to localize a fault, simplifying network fault localization and reducing network overhead.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWINGS

The accompanying drawings incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

Embodiments herein relate to fault localization in a network. In particular, embodiments relate to identifying a particular communication link of a plurality of communication links as a problematic communication link based on values associated with the communications links, such as probabilities, which are updated based on the results of path measurements taken over time.

Figure 1:
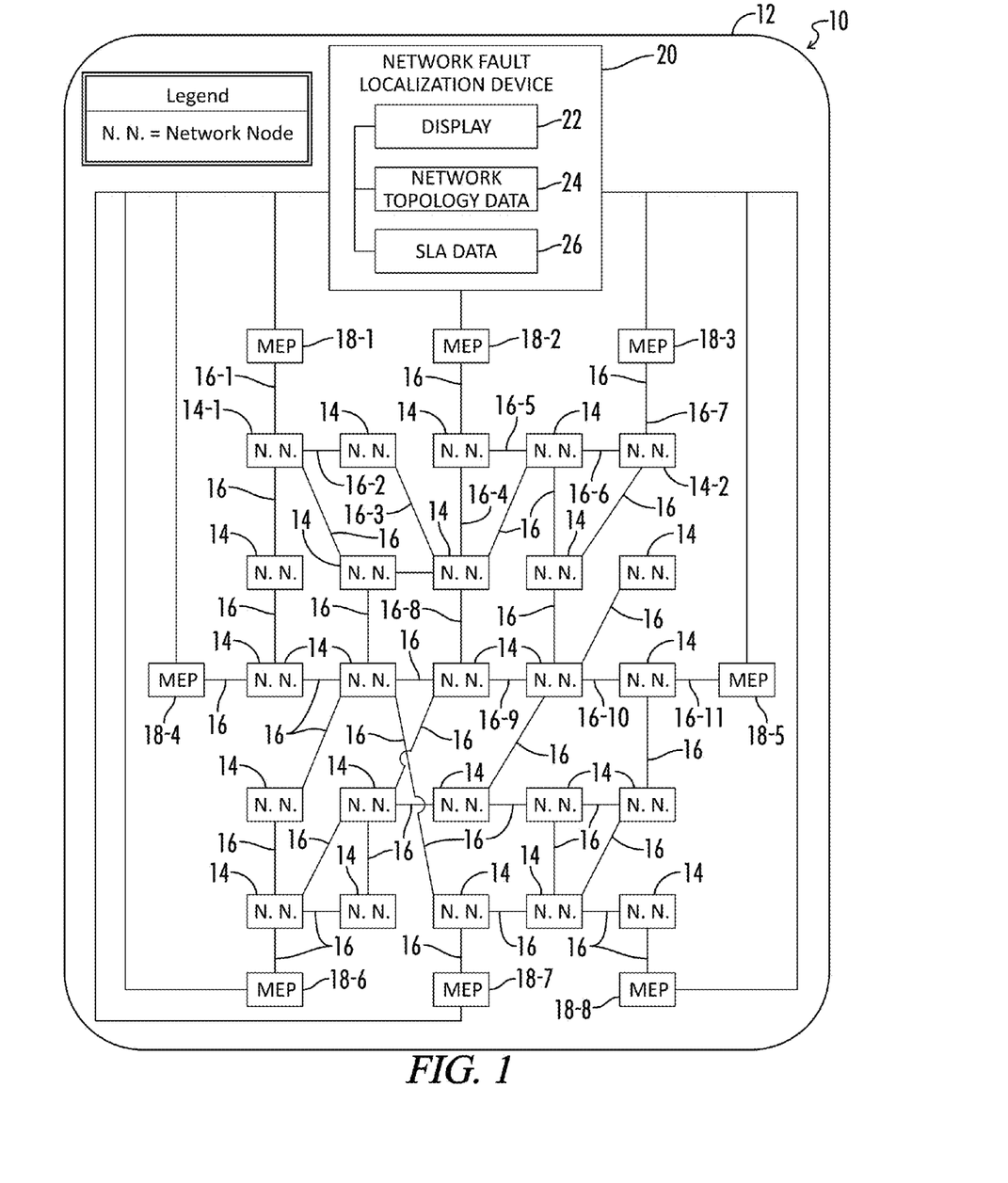
FIG. 1 is a block diagram of a system in which embodiments may be practiced.

FIG. 1 is a block diagram of a system 10 in which embodiments may be practiced. The system 10 includes one or more networks 12 made up of a plurality of network nodes 14, 14-1, and 14-2 (generally, network nodes 14), interconnected by communication links 16 and 16-1-16-11 (generally, communication links 16). Each network node 14 may comprise a device such as a switch, router, gateway, server, or any other network element. Each communication link 16 may comprise any communication medium suitable for communicatively coupling two network nodes 14 together, including, for example, wireline, wireless, and optical communication mediums.

A plurality of measurement endpoints (MEPs) 18 are coupled to one or more network nodes 14. While shown separately from the network nodes 14 for ease of illustration, one or more of the MEPs 18 may be integrated with a network node 14, and thus a single network element may comprise both a network node 14 and a MEP 18.

The MEPs 18 are communicatively coupled to a network fault localization (NFL) device 20. The NFL device 20 may include, for example, a display 22 for, among other things, identifying one or more problematic communication links 16 to an operator. The NFL device 20 may also include network topology data 24 that comprises information identifying paths through the network 12, from one MEP 18 to another MEP 18. In some embodiments, the network topology data 24 may include data that models the network 12 as a graph comprising nodes that represent network nodes 14, and edges that represent communication links 16. The NFL device 20 may also include service level agreement (SLA) data 26 that includes performance metrics for paths through the network 12, such as one-way delay, round-trip delay, jitter, packet loss, available path capacity, or service availability (i.e., another MEP 18 is unreachable). While for purposes of illustration the NFL device 20 is shown as a separate device from the network nodes 14, in other embodiments the functionality described herein may be implemented in one or more of the network nodes 14, or in any other suitable network-attached device.

The network 12 includes a plurality of paths from one MEP 18 to another MEP 18. A path defines the communication links 16 traversed by packets sent from one MEP 18 to another MEP 18. Each path includes at least one communication link 16, and in practice, paths through the network 12 may include a plurality of communication links 16. As an example, a path from the MEP 18-1 to the MEP 18-3 may include communication links 16-1-16-7. Thus, packets communicated from the MEP 18-1 to the MEP 18-3 traverse communication links 16-1-16-7. As discussed earlier, in some embodiments, one or more of the MEPs 18 may be integrated with the network nodes 14, such that, for example, the MEP 18-1 may be integrated with a network node 14-1 and the MEP 18-3 may be integrated with a network node 14-2. In such embodiment, the path from the MEP 18-1 to the MEP 18-3 may comprise communication links 16-2-16-6.

As another example, a path from the MEP 18-1 to the MEP 18-5 may include the communication links 16-1-16-3 and 16-8-16-11. Note that some communication links 16, such as the communication links 16-1-16-3, are included in, or participate in, multiple paths, including the path from the MEP 18-1 to the MEP 18-3 and the path from the MEP 18-1 to the MEP 18-5. Thus, a communication link 16 may participate in one or more paths through the network 12.

Paths through the network 12 may be determined, for example, by an algorithm such as Open Shortest Path First (OSPF), can be defined via traffic engineering using network protocols such as Resource Reservation Protocol-Traffic Engineering (RSVP-TE) and a path computation engine, can be configured by an operator, or can be determined in any other suitable manner. The identification of paths, in one embodiment, may be part of the network topology data 24.

In one embodiment, the MEPs 18 periodically take path measurements of paths in the network 12. A path measurement may be taken by sending one or more test packets along the path, and measuring characteristics of the test packets as the test packets traverse the path. Such characteristics can be based on measurements, or information, generated by the MEPs 18, and/or information or measurements generated by network nodes 14 along the path. Thus, network nodes 14 along the path may also take measurements, or otherwise facilitate measurements, by providing data, such as timestamps or other information, to facilitate path measurements.

The techniques or mechanisms used for implementing path measurements may differ depending on a number of factors, including, for example, characteristics of the particular network 12. In one embodiment, the network 12 may comprise an Internet Protocol (IP) network and path measurements may be facilitated via Internet Engineering Task Force (IETF) Two-Way Active Measurement Protocol (TWAMP), IETF Internet Control Message Protocol (ICMP), or a Cisco SLA protocol. If the network 12 is an Ethernet or Multiprotocol Label Switching (MPLS) network, path measurements may be facilitated, for example, via mechanisms disclosed in International Telecommunication Union ITU-T Y.1731 "OAM functions and Mechanisms for Ethernet Based Networks." If the network 12 is a MPLS-Transport Profile (TP) network, path measurements may be based, for example, on IETF Request for Comments (RFC) 6371 "Operations, Administration, and Maintenance Framework for MPLS-Based Transport Networks." Notably, the network 12 may have multiple characteristics and utilize multiple different path measurement mechanisms. For example, the network 12 may be both an IP network and an Ethernet network, and may use path measurement mechanisms associated with either IP networks, Ethernet networks, or both.

Results of such path measurements are provided to the NFL device 20, and the NFL device 20, based in part on such path measurements, identifies one or more particular communication links 16 as a problematic communication link 16, facilitating corrective action that may reduce or eliminate more severe disruptions to the network 12.

Figure 2:
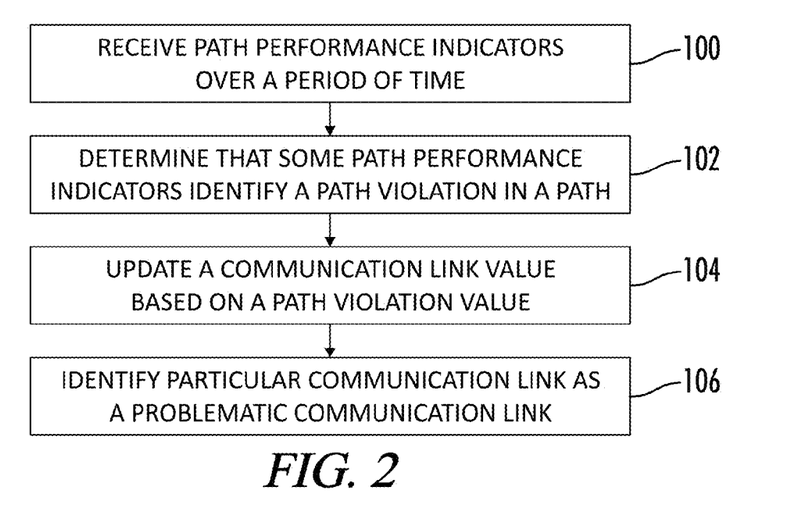
FIG. 2 is a flowchart illustrating a method for monitoring communication links in a network according to one embodiment.

FIG. 2 is a flowchart illustrating a method for monitoring the communication links 16 in the network 12 according to one embodiment. FIG. 2 will be discussed in conjunction with FIG. 1. Over a period of time, the NFL device 20 receives a plurality of path performance indicators from a plurality of the MEPs 18 (FIG. 2, block 100). Path performance indicators comprise data that is based on a path measurement from one MEP 18 to another MEP 18. Thus, a path performance indicator corresponds to a particular path in the network 12. A path performance indicator may contain the results of a path measurement of a path between two MEPs 18, and may also contain a conclusion based on a path measurement, such as that the path measurement indicates a problem in the path or does not. In some embodiments, a path performance indicator may contain both results and a conclusion. As will be discussed in greater detail herein, such path measurements may be made by the MEPs 18 arbitrarily, randomly, periodically, or in accordance with a path measurement schedule.

The NFL device 20 determines that at least some of the path performance indicators identify a path violation in the corresponding path (FIG. 2, block 102). As will be discussed in greater detail herein, the NFL device 20 may make the determination that a path performance indicator identifies a path violation based on a path violation criterion, or may determine the path violation by receiving an indication from another device that the path performance indicator identifies a path violation. In some embodiments, the path violation criterion is defined or identified in the SLA data 26 pursuant to a SLA associated with the network 12.

Path violations may be based on any desired path metric, including, for example, one-way delay, round-trip delay, jitter, packet loss, available path capacity, service availability, and the like. Thus, path violations may be identified as a particular type of path violation, such as a one-way delay path violation, a round-trip delay path violation, a jitter path violation, a packet loss path violation, an available path capacity path violation, or a service availability path violation.

For each path performance indicator that identifies a path violation, the NFL device 20 updates a communication link value associated with each communication link 16 in the corresponding path based on a path violation value (FIG. 2, block 104). The NFL device 20 may maintain in the network topology data 24 those communication links 16 which make up a particular path, and/or the path performance indicator may include information that identifies each communication link 16 in the corresponding path.

Communication link values may be maintained, for example, in the network topology data 24 or elsewhere by the NFL device 20. Communication link values are associated with corresponding communication links 16, and over the period of time, those communication links 16 that are in paths in which path violations occur will tend to have higher communication link values than those communication links 16 that are not in such paths. The precise value of the path violation value used to update the communication link value may be determined by an operator, or determined experimentally over time. In one embodiment, the path violation value may be greater than 1.0, such as 1.1, and the updating of the communication link value may involve multiplying the current communication link value by the path violation value. Thus, the update process increases the communication link value (i.e., probability) of the communication link 16 when the communication link 16 is involved in a path violation.

After or during the period of time, the NFL device 20 identifies at least one particular communication link 16 as a problematic communication link 16 based on a comparison between a problematic link criterion and the communication link value associated with the at least one communication link 16 (FIG. 2, block 106). The problematic link criterion may comprise, for example, a threshold value determined experimentally, or otherwise. In some embodiments, the threshold value may be relative to the communication link values associated with others of the communication links 16.

The NFL device 20 may identify the at least one particular communication link 16 as the problematic communication link 16 in one or more different ways. The NFL device 20 may effect presentation on a display of an identification of the at least one communication link 16 with a message identifying the at least one particular communication link 16 as the problematic communication link 16. The display may be coupled to or integrated with the NFL device 20, such as the display 22, or may comprise a display associated with another device. Presentation of the identification of the at least one communication link 16 may be concurrently effected on a plurality of different devices. In some embodiments, the message comprises an alert message, and may include visual characteristics to distinguish the alert message from other messages. The NFL device 20 may identify a plurality of particular communication links 16 as problematic communication links 16 if the communication link values associated with the plurality of particular communication links 16 all exceed the problematic link criterion.

In some embodiments, after the receipt of a path performance indicator that identifies a path violation in a corresponding path, the NFL device 20 updates each communication link value that is associated with a communication link 16 that is not in the corresponding path based on a path non-violation value. The path non-violation value is preferably lower than the path violation value, and may be a negative value, to ensure that, over the period of time, the communication link values of the communication links 16 that are repeatedly identified as being in a path in which path violations have occurred diverge from the communication link values of the communication links 16 that are repeatedly not in such paths. In one embodiment, the path non-violation value may be less than 1.0, such as 0.9, and the updating of the communication link value may involve multiplying the current communication link value by the path non-violation value. Thus, the update process decreases the communication link value (i.e., probability) of the communication link 16 when the communication link 16 is not involved in a path violation.

In one embodiment, the NFL device 20 also determines that others of the path performance indicators received over the period of time indicate that no violation occurred in a particular path of the network 12. The NFL device 20 then updates the communication link value associated with each communication link 16 in the network based on the path non-violation value.

As will be discussed in greater detail herein, in some embodiments, the communication link values comprise probabilities that the corresponding communication links 16 are problematic communication links 16. Thus, the NFL device 20 may normalize the communication link values of all communication links 16 after processing a path performance indicator, such that the probabilities range between a desired range of probabilities, such as 0 to 1.

Figure 3:
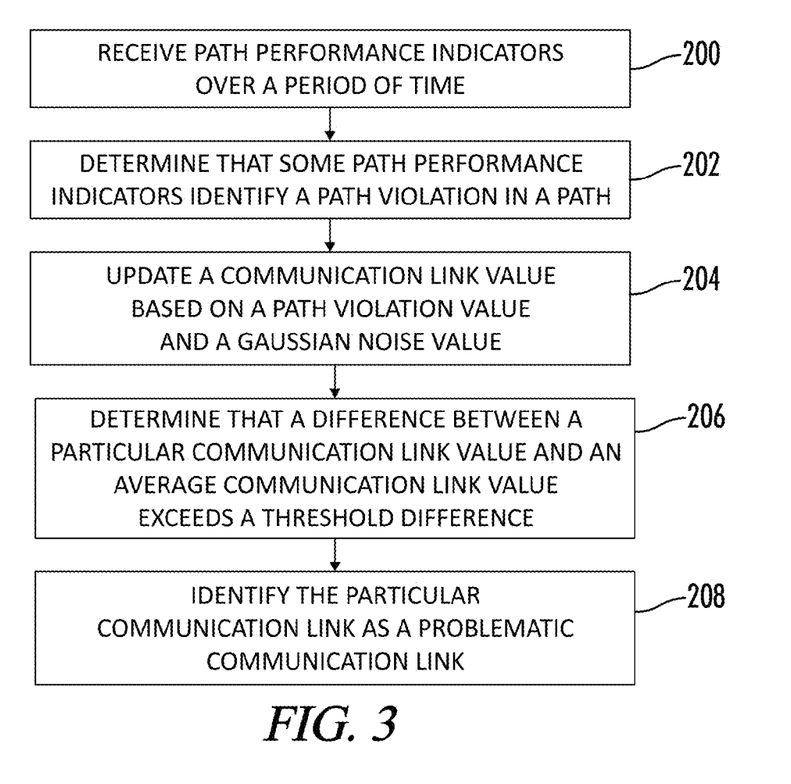
FIG. 3 is a flowchart illustrating a method for monitoring communication links in a network according to another embodiment.

FIG. 3 is a flowchart illustrating a method for monitoring communication links in a network according to another embodiment, and will be discussed in conjunction with FIG. 1. As discussed with regard to FIG. 2, the NFL device 20 receives a plurality of path performance indicators over a period of time (FIG. 3, block 200). The NFL device 20 determines that some path performance indicators identify a path violation in a corresponding path in the network 12 (FIG. 3, block 202). In this embodiment, the NFL device 20 updates the communication link value associated with each communication link in the corresponding path based on the path violation value and on a Gaussian noise value (FIG. 3, block 204). The use of a Gaussian noise value may increase the efficiency of the process. The mean and standard deviations of the Gaussian noise value may be configurable parameters. A relatively high Gaussian mean value typically results in fast tracking properties while a relatively low Gaussian mean value typically provides estimation stability.

In this embodiment, the NFL device 20 may determine that a difference between the communication link value of a particular communication link 16 and the average communication link value of the communication links 16 exceeds a threshold difference (FIG. 3, block 206). The average communication link value may include the communication link value of the particular communication link 16, or may be an average of all communication link values other than the communication link value of the particular communication link 16. The NFL device 20 then identifies the particular communication link 16 as a problematic communication link 16 (FIG. 3, block 208). Thus, in this embodiment, the problematic link criterion defining what constitutes a problematic communication link 16 is relative.

Figure 4:
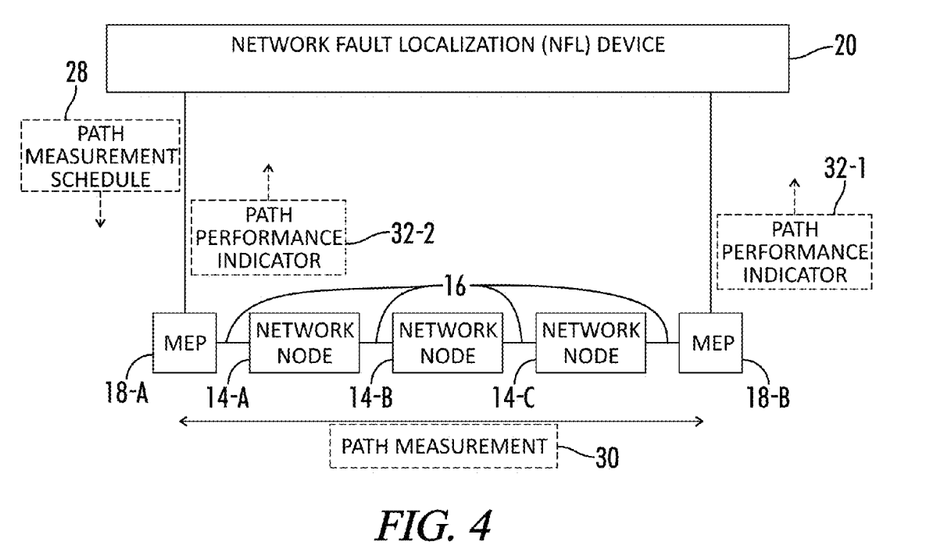
FIG. 4 is block diagram of an embodiment for monitoring a network wherein the path measurements are performed by a measurement endpoint in accordance with a schedule.

FIG. 4 is block diagram of an embodiment for monitoring a network wherein the path measurements are performed by a MEP 18 in accordance with a schedule. In this embodiment, the NFL device 20, or other device, provides the MEPs 18 a path measurement schedule 28 that indicates the type of path measurements to be taken, and times for taking the path measurements. Thus, in one embodiment, the path measurement schedule 28 comprises instructions to the MEPs 18 to perform path measurements over the network 12, and the path performance indicators are received by the NFL device 20 in response to such instructions. The NFL device 20, or other device, may provide each MEP 18 with a different path measurement schedule 28. The path measurement schedule 28 may indicate that the path measurements should be taken at predetermined periodic times, predetermined random times, or may leave it to the MEP 18 to determine precisely when to take the path measurements. The MEP 18 may also determine, in some embodiments randomly, which particular paths should be measured.

Assume that in accordance with the path measurement schedule 28 a MEP 18-A takes a path measurement 30 by initiating one or more test packets along a path that includes a plurality of network nodes 14-A-14-C and ultimately reaches a MEP 18-B. Assume further that, in this example, the path measurement 30 comprises a measurement of a metric that can be determined by a one-way transmission of the test packets from the MEP 18-A to the MEP 18-B. In some embodiments, each network node 14-A-14-C may, as the one or more test packets arrive at the respective network node 14-A-14-C, add information to the test packets that facilitates the path measurement 30. The MEP 18-B receives the one or more test packets, and, based on the one or more test packets, sends a path performance indicator 32-1 to the NFL device 20 that indicates the results of the path measurement 30.

If the path measurement 30 involved a measurement of a metric that is determined by a round-trip transmission, the MEP 18-B may send the one or more test packets back along the same path to the MEP 18-A. Again, the network nodes 14-A-14-C may, as the one or more test packets arrive at the respective network node 14-A-14-C, add information to the test packets that facilitates the path measurement 30. The MEP 18-A receives the one or more test packets, and based on the one or more test packets, sends a path performance indicator 32-2 to the NFL device 20 that indicates the results of the round-trip path measurement 30.

Figure 5:
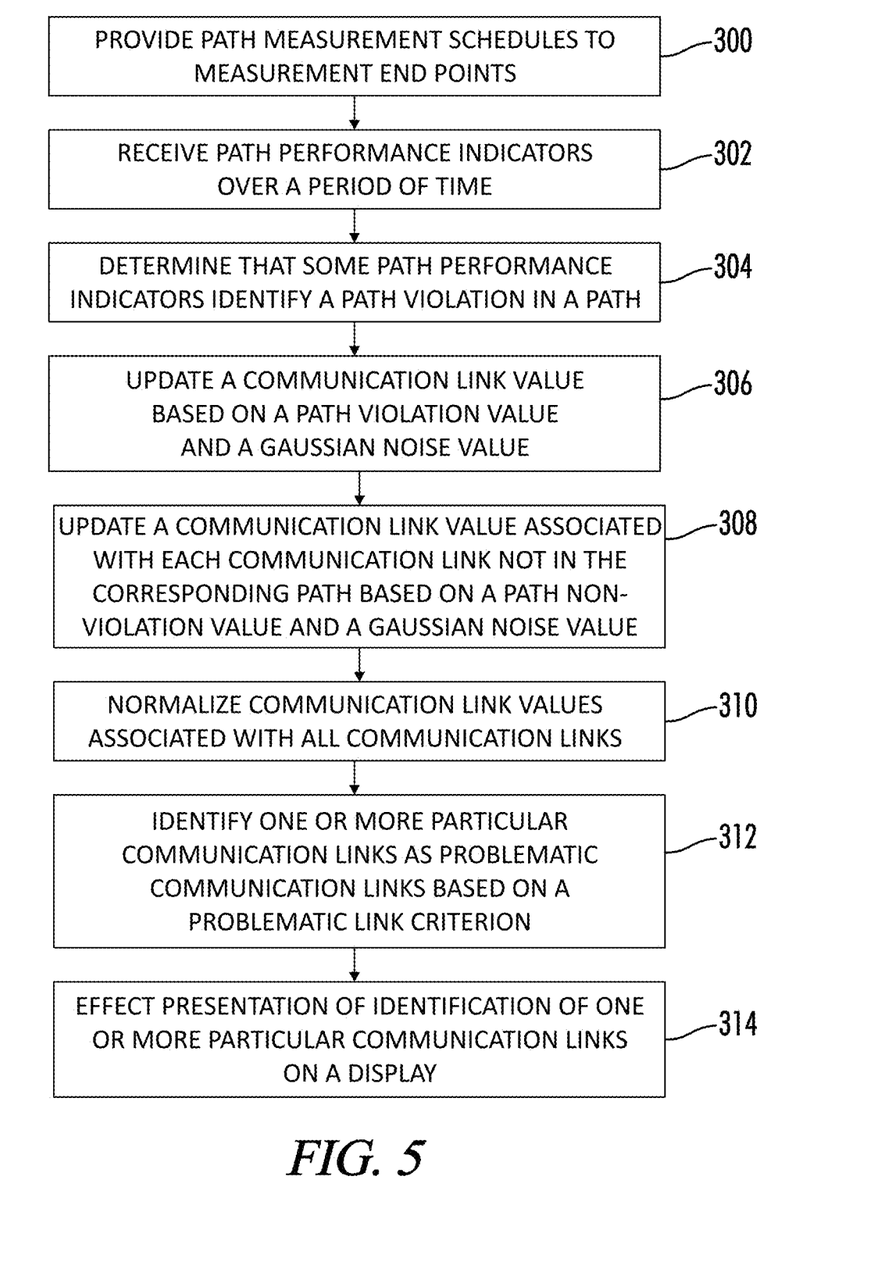
FIG. 5 is a flowchart illustrating a method for monitoring a network according to another embodiment.

FIG. 5 is a flowchart illustrating a method for monitoring a network according to another embodiment. FIG. 5 will be discussed in conjunction with FIG. 4. The NFL device 20 provides path measurement schedules 28 to a plurality of the MEPs 18 as discussed previously (FIG. 5, block 300). Each path measurement schedule 28 may be different, and may include information such as the types of path measurements each respective MEP 18 should take, as well as times the path measurements should be taken. Alternately, the path measurement schedules 28 may indicate to one or more MEPs 18 that the path measurements should be taken at arbitrary and random times determined by the respective MEP 18. In other embodiments, the MEPs 18 may be individually configured, perhaps by an operator, with appropriate path measurement schedules 28, and the MEPs 18 may not receive path measurement schedules 28 from the NFL device 20.

The NFL device 20 receives path performance indicators from the MEPs 18 over a period of time (FIG. 5, block 302). The NFL device 20 determines that at least some path performance indicators identify a path violation in the corresponding path in the network 12 (FIG. 5, block 304). The NFL device 20 updates a communication link value associated with each communication link 16 and the corresponding path based on the path violation value and a Gaussian noise value (FIG. 5, block 306). In some embodiments, the NFL device 20 may also update the communication link value associated with each communication link 16 that is not in the corresponding path based on a path violation value and a Gaussian noise value (FIG. 5, block 308). The NFL device 20 may normalize the communication link values associated with all communication links 16 in the network 12, in order to maintain a predetermined range of the communication link values, such as 0 to 1 (FIG. 5, block 310). The NFL device then identifies one or more particular communication links 16 as problematic communication links 16 based on a comparison between a problematic link criterion and the communication link values associated with the one or more particular communication links 16 (FIG. 5, block 312). The NFL device 20 effects presentation of the identification of one or more particular communication links 16 on a display (FIG. 5, block 314).

Figure 6A:
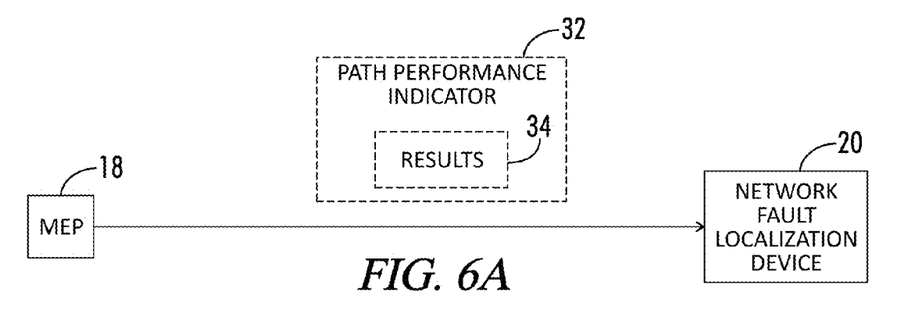
FIGS. 6A-6C are block diagrams illustrating different embodiments for determining that a path performance indicator identifies a path violation.
Figure 6B:
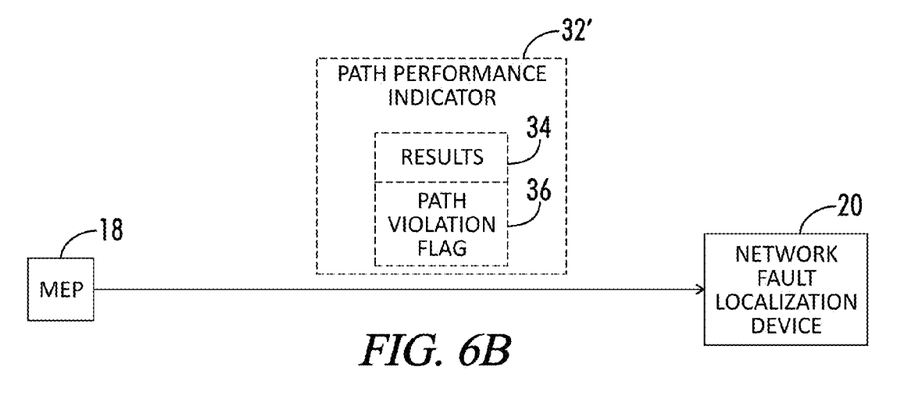
Figure 6C:
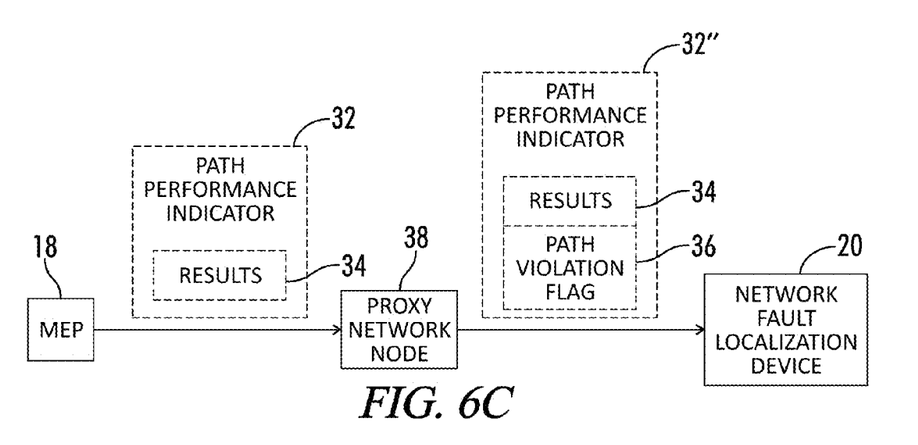

FIGS. 6A-6C are block diagrams illustrating different embodiments for determining that a path performance indicator identifies a path violation. Referring first to FIG. 6A, in one embodiment, the MEP 18 takes a path measurement of a path in the network 12, and generates results 34 of the path measurement. The MEP 18 generates a path performance indicator 32 that includes results 34 and sends the path performance indicator 32 directly to the NFL device 20. "Directly" in this context means that the path performance indicator 32 is not substantially altered by any intermediate devices that may be in the path between the MEP 18 and the NFL device 20. The NFL device 20 receives the path performance indicator 32, and extracts the results 34 from the path performance indicator 32. The path performance indicator 32 may also identify the corresponding path, and/or the network nodes 14 in the corresponding path. The NFL device 20 accesses the SLA data 26 (FIG. 1), and determines a path violation criterion to be used for the particular path measurement as the basis for determining whether or not the results 34 constitute a path violation. Based on the identified path violation criterion and the results 34, the NFL device 20 makes a determination that the path performance indicator 32 constitutes a path violation, or does not constitute a path violation.

FIG. 6B illustrates an embodiment wherein the MEP 18 similarly takes a path measurement of a path in the network 12, and generates results 34 of the path measurement. However, in this embodiment, the MEP 18 accesses data, such as the SLA data 26, to determine whether the results 34 constitute a path violation. The SLA data 26 may be stored on the MEP 18, or on a device communicatively coupled to the MEP 18. Based on the SLA data 26, the MEP 18 determines a path violation criterion to be used as the basis for determining whether or not the results 34 constitute a path violation. Assume that based on the identified path violation criterion and the results 34, the MEP 18 identifies the results 34 as a path violation. The MEP 18 generates a path performance indicator 32' that includes a path violation flag 36 set to a value of TRUE. The MEP 18 sends the path performance indicator 32' to the NFL device 20. The NFL device 20 determines that the path performance indicator 32' identifies a path violation based on the value of the path violation flag 36. Thus, in this embodiment, the NFL device 20 receives from a different device, in this example the MEP 18, information indicating that that path performance indicator 32' identifies a path violation.

FIG. 6C illustrates an embodiment wherein the MEP 18 similarly takes a path measurement of a path in the network 12, and generates results 34 of the path measurement. However, in this embodiment, the MEP 18 sends the path performance indicator 32 containing the results 34 to an intermediate node, such as a proxy network node 38. The proxy network node 38 receives the path performance indicator 32, and extracts the results 34 from the path performance indicator 32. The proxy network node 38 accesses the SLA data 26 which in this embodiment may be stored on the proxy network node 38, or on a device communicatively coupled to the proxy network node 38. Based on the SLA data 26, the proxy network node 38 determines a path violation criterion to be used as the basis for determining whether or not the results 34 constitute a path violation. Assume that, based on the identified path violation criterion and the results 34, the proxy network node 38 identifies the results 34 as a path violation. The proxy network node 38 generates a path performance indicator 32" that includes a path violation flag 36 set to a value of TRUE. The proxy network node 38 sends the path performance indicator 32" to the NFL device 20. The NFL device 20 determines that the path performance indicator 32" identifies a path violation based on the value of the path violation flag 36. Thus, this is another embodiment in which the NFL device 20 receives from a different device, in this example the proxy network node 38, information indicating that that path performance indicator 32" identifies a path violation.

Figure 7:
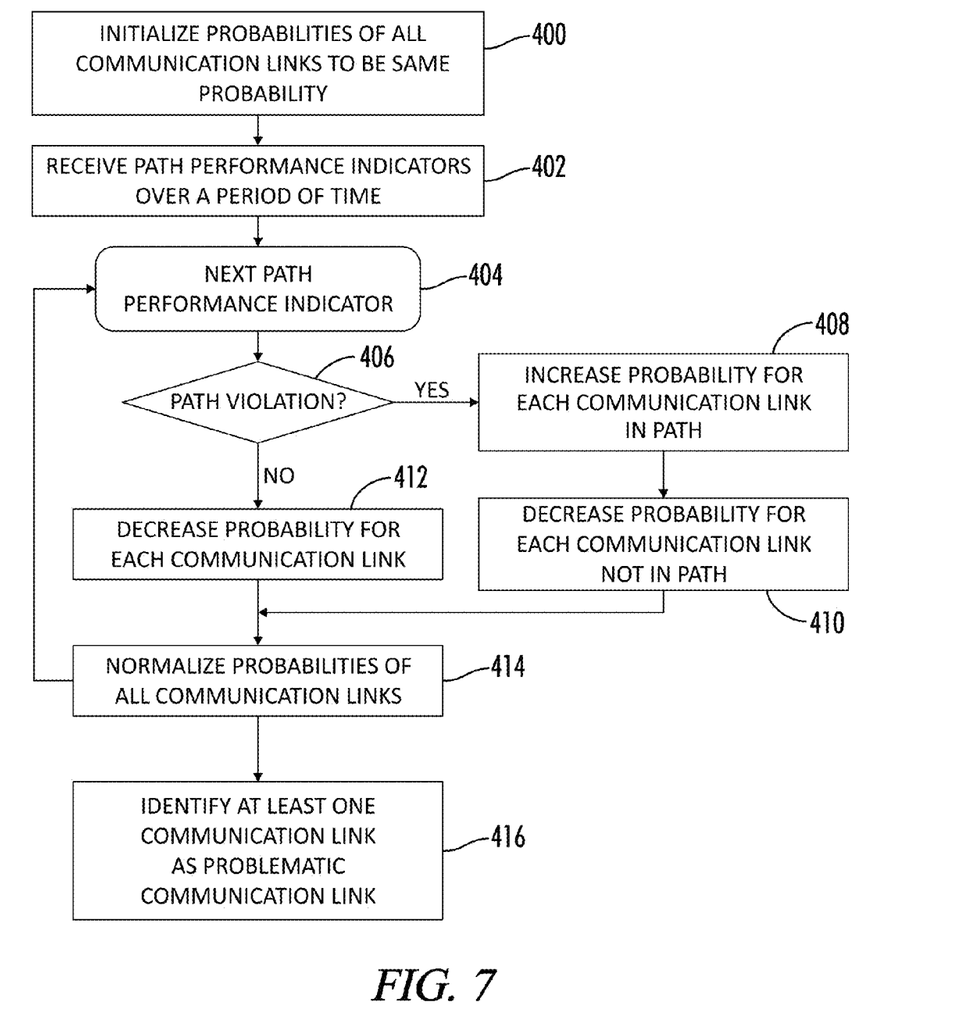
FIG. 7 is a flowchart illustrating a method for monitoring a network according to another embodiment.
Figure 8A:
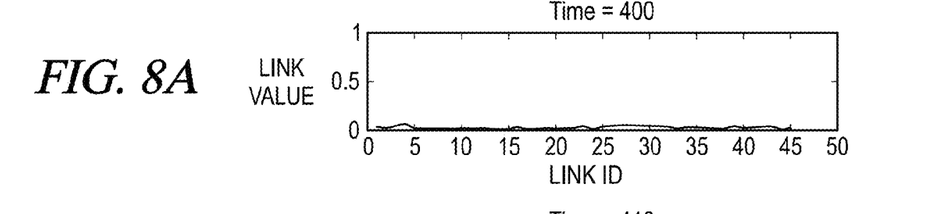
FIGS. 8A-8F are graphs illustrating example communication link values over a period of time during a simulation of embodiments disclosed herein.
Figure 8B:
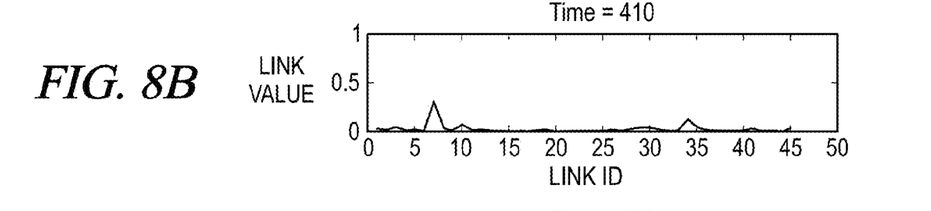
Figure 8C:
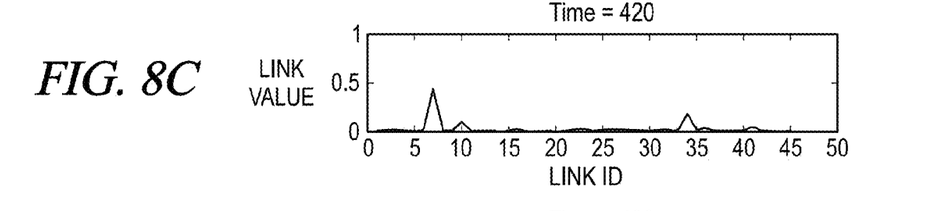
Figure 8D:
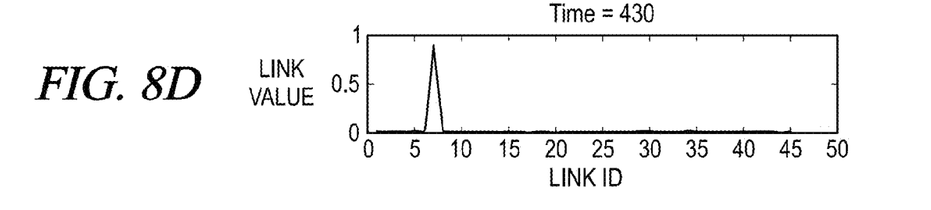
Figure 8E:
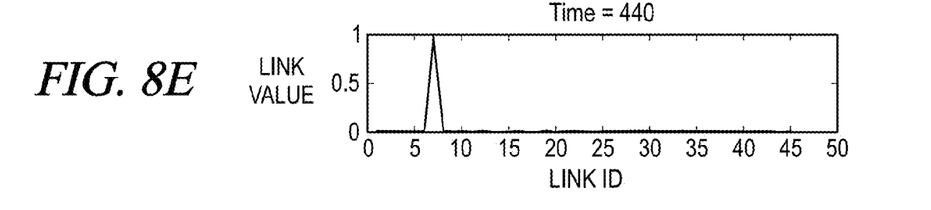
Figure 8F:
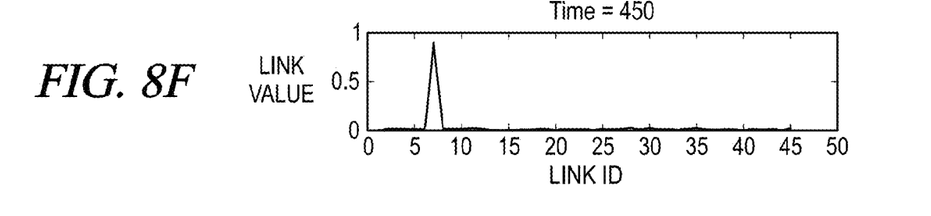

FIG. 7 is a flowchart illustrating a method for monitoring the network 12 according to another embodiment. In this embodiment, the communication link values comprise probabilities. FIG. 7 will be discussed in conjunction with FIG. 1. Initially, the NFL device 20 initializes the probabilities of all the communication links 16 to be the same probability (FIG. 7, block 400). The NFL device receives a plurality of path performance indicators 32 over a period of time (FIG. 7, block 402). For each path performance indicator 32, the NFL device 20 determines whether the respective path performance indicator 32 identifies a path violation in a corresponding path in the network 12 (FIG. 7, blocks 404 and 406). If the path performance indicator 32 identifies a path violation, the NFL device 20 increases the probability associated with each communication link 16 in the corresponding path (FIG. 7, block 408). The NFL device 20 also decreases the probability associated with each communication link 16 that is not in the corresponding path (FIG. 7, block 410). If the NFL device 20 determined that the path performance indicator 32 did not identify a path violation, then the NFL device 20 decreases the probability associated with each communication link 16 in the network 12 (FIG. 7, block 412). The NFL device 20 then normalizes the probabilities of all the communication links 16 in the network 12 (FIG. 7, block 414). Subsequent to the period of time, the NFL device 20 identifies at least one communication link 16 as a problematic communication link 16, based on a determination that the probability associated with the at least one communication link 16 is higher than a threshold probability (FIG. 7, block 416).

As briefly discussed above, in some embodiments, the NFL device 20 may model the network 12 as a graph comprising nodes that represent the network nodes 14, and edges that represent the communication links 16. Assume a system state that can be modeled as a first-order Markov process such that $$a_k = g(a_{k-1}) + w_k \qquad (1)$$

where $a_k$ is the system state at time k, $w_k$ is noise with some probability distribution function, and g(.) is an arbitrary function. In one embodiment, the system state is discrete and corresponds to an edge identifier, and thus, the noise term may be zero. If there is no path violation in the network 12, the state $a_k$ does not point out any edge.

The NFL device 20 may assume that consecutive path measurements of the system state $z_k$ are independent of one other. Further, the path measurements $z_k$ are only dependent on $a_k$ such that $$z_k = h(a_k) + v_k \qquad (2)$$

where $v_k$ is noise with some probability distribution function.

In one embodiment, the NFL device 20 models a fault location (i.e. an edge in a graph "G", or a communication link 16 in the network 12) as the system state $a_k$. In other words, the system state is discrete. The path measurements $z_k$ may correspond to the measurements of metrics, such as one-way delay, a round-trip delay, jitter, available path capacity, or service availability between two of the MEPs 18.

A path measurement z is defined by $<m_i, m_e, P, b>$ where $m_i$ is the ingress MEP 18, $m_e$ is the egress MEP 18, P is the path between $m_i$ and $m_e$, and b is a Boolean value which is either true or false.

$$b = \begin{cases} \text{true} & \text{path - violation} \\ \text{false} & \text{no - path - violation} \end{cases} \qquad (3)$$

Thus, if there is a path violation, b=true; otherwise, b=false. The elements of z may be denoted as $z_{mi}, z_{me}, z_P$, and $z_b$.

In one embodiment, the NFL device 20 constructs a discrete sample-based representation of the probability distribution function (PDF) for the system state being tracked. In this embodiment, the PDF that is used for tracking $a_k$ is discrete and represents the weights (i.e., probabilities or communication link values) of all edges in G.

In this embodiment, each edge x may be represented as a vector $<e, w>$ where e is the edge identifier and w is the weight which comprises a normalized probability. The elements of x are denoted $x_e$ and $x_w$. Each edge x belongs to a set S and the number of edges in the set is denoted P. In this embodiment, P equals the number of edges (i.e., communication links 16) in the graph (i.e., network 12).

In this embodiment, the NFL device 20 may be considered to operate in two phases: a prediction phase and an update phase. In the prediction phase, each edge is updated according to a model known to govern the system state. Moreover, the update phase involves recalculating the weight (i.e., probability or communication link value) based on the path measurements of the system 10.

The prediction phase may be modeled as $a_k = a_{k-1} + w_k$ for simplicity, while the update phase may be based on the path measurements.

In one embodiment, the algorithm may be stated as the following:

1. Construct initial set S of P edges with equal weight 1/P
2. S'={0}, i.e. S' is the empty set
3. For i=1, ..., P
   Calculate the new weight $w'_i = p(z, x'_i)$ for edge $x'_i$ from the set S given sample z, add Gaussian noise to $w'_i$
   Update the new edge set S', S'=union(S', {$x'_i$})
4. Normalize $w'_i$ for i=1, ..., P
5. If the probability $w'_i$ is higher than a threshold value T, the edge corresponding to $x'_i$ is considered the problematic edge
6. S=S'

Steps 2-6 may be repeated for each new measurement z. Gaussian noise is added to the weight component of an edge x' in order to increase the efficiency of the process. The mean and standard deviations of the Gaussian noise value may be configurable parameters. A relatively high Gaussian mean value typically results in fast tracking properties while a relatively low Gaussian mean value typically provides estimation stability.

One aspect of determining which edge is the problematic edge is defining a weight (i.e., probability) update function p(z, x). In one embodiment, the NFL device 20 may update probabilities associated with edges according to the following update formula:

$$w_k^i = w_{k-1}^i p(z, x) \quad (4)$$

where $$p(z, x) = \begin{cases} \delta & (z_b = \text{true}) \wedge (x_e \in z_P) \\ \gamma & \text{otherwise} \end{cases} \quad (5)$$

where $\delta \gg \gamma$.

The update formula may be used, in conjunction with a normalization step, to either increase or decrease the probability associated with the edge. Thus, if an edge x is on a path P where a path violation occurs (i.e. $z_b$=true), then the probability increases. Otherwise, the probability decreases.

Those of skill in the art will appreciate that the formulas (4) and (5) are merely example update functions, and that any number of suitable update functions may be used with the embodiments discussed herein.

FIGS. 8A-8F are graphs illustrating example communication link values over a period of time during a simulation of embodiments disclosed herein. In this simulation, the network 12 comprises eight (8) MEPs 18, twenty-five (25) network nodes 14 with switching or routing functionality, and forty-four (44) communication links 16 coupling the 8 MEPs 18 and the 25 network nodes 14. The 44 communication links 16 are identified in FIGS. 8A-8F by link identifiers (link IDs) 1-44. An initial weight of 1/44 is assigned to the communication link value of each communication link 16. Paths between the 8 MEPs 18 are determined in accordance with an Open Shortest Path First (OSPF) algorithm. A fault is introduced onto the communication link 16 having a link ID 7 at Time=400. FIGS. 8A-8F illustrate the link values of the 44 communication links 16 over the period of time from Time=400 to Time=450, and how, over such period of time, the probability associated with the communication link 16 having the link ID 7 approaches 1.

In one embodiment, the NFL device 20 may effect presentation of such a graph to an operator to permit human determination of problematic communication links 16.

Figure 9:
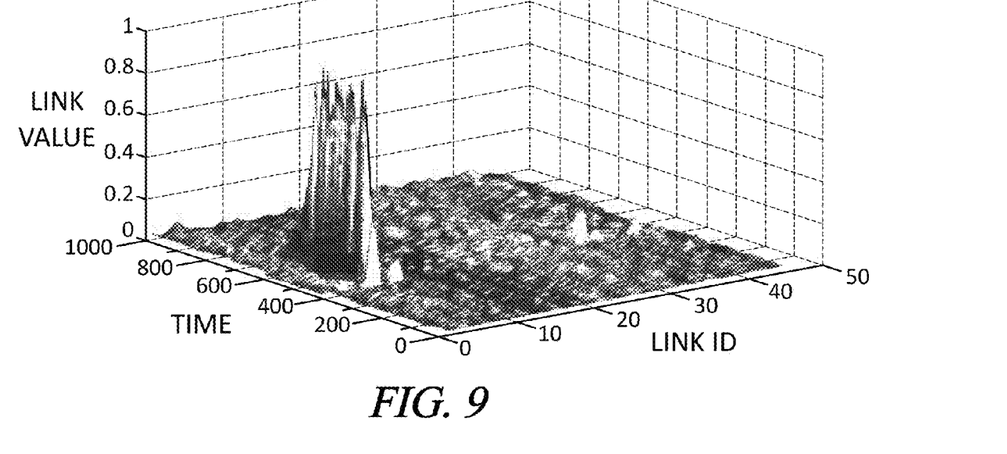
FIG. 9 is a three-dimensional graph illustrating communication link values over a period of time.

FIG. 9 is a three-dimensional graph illustrating communication link values over a period of time. In this embodiment, a fault is introduced onto the communication link 16 having the link ID 7 between Times 400 and 600. As illustrated in FIG. 9, the communication link value (in this embodiment, a probability) associated with the link ID 7 relatively quickly becomes substantially greater than all other communication link values. Note that because the link ID 7 shares communication paths with other communication links 16, other communication links 16 may have relatively small increases periodically.

Figure 10:
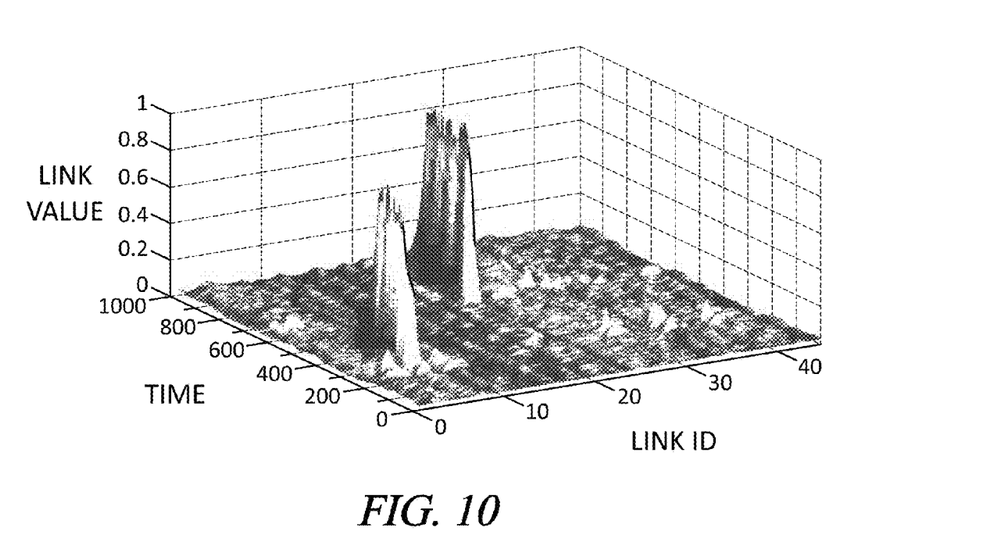
FIG. 10 is another three-dimensional graph illustrating communication link values over a period of time.

FIG. 10 is another three-dimensional graph illustrating communication link values over a period of time. In this embodiment, a fault is introduced onto the communication link 16 having the link ID 7 between Times 200 and 400, and onto the communication link 16 having a link ID 22 between Times 600 and 800. As illustrated in FIG. 10, the communication link value (in this embodiment, a probability) associated with the link IDs 7 and 22 relatively quickly become substantially greater than all other communication link values. Note that because the link IDs 7 and 22 share communication paths with other communication links 16, other communication links 16 may have relatively small increases periodically.

Figure 11:
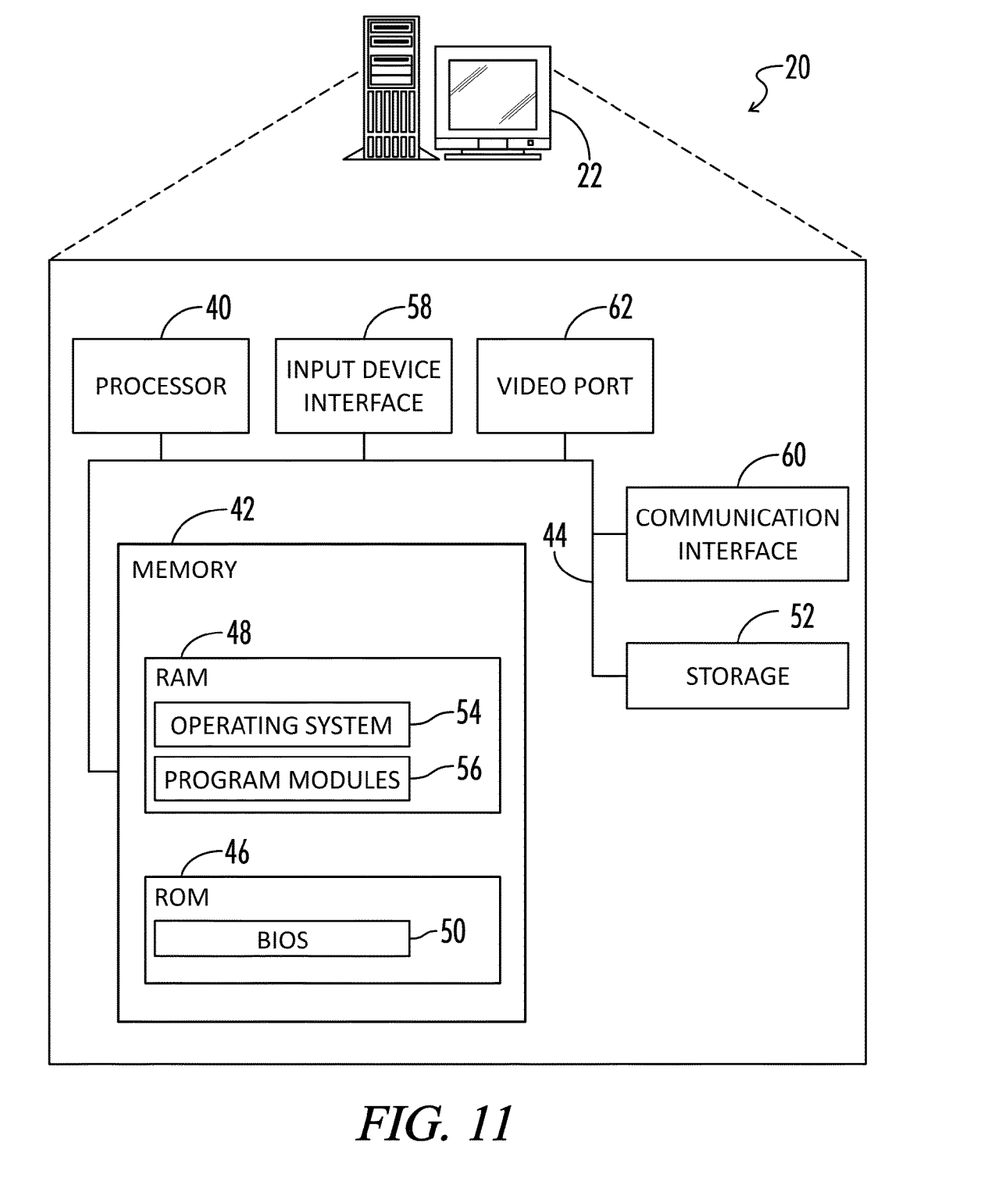
FIG. 11 is a block diagram of an example network fault localization device suitable for practicing embodiments disclosed herein.

FIG. 11 is a block diagram of a NFL device 20 suitable for practicing the embodiments. The NFL device 20 may comprise, for example, a laptop computer, a desktop computer, a workstation, a server, or any other processing device, including special-purpose processing devices, capable of implementing the functionality described herein. The NFL device 20 includes a processor 40, a system memory 42, and a system bus 44. The system bus 44 provides an interface for system components including, but not limited to, the system memory 42 and the processor 40. The processor 40 can be any commercially available or proprietary processor. Dual microprocessors and other multi-processor architectures may also be employed as the processor 40.

The system bus 44 may be any of several types of bus structures that may further interconnect to a memory bus (with or without a memory controller), a peripheral bus, and/or a local bus using any of a variety of commercially available bus architectures. The system memory 42 may include non-volatile memory 46 (e.g., read only memory (ROM), erasable programmable read only memory (EPROM), electrically erasable programmable read only memory (EEPROM), etc.) and/or volatile memory 48 (e.g., random access memory (RAM)). A basic input/output system (BIOS) 50 may be stored in the non-volatile memory 46, and can include the basic routines that help to transfer information between elements within the NFL device 20. The volatile memory 48 may also include a high-speed RAM, such as static RAM for caching data.

The NFL device 20 may further include a computer-readable storage 52, which may comprise, for example, an internal hard disk drive (HDD) (e.g., enhanced integrated drive electronics (EIDE) or serial advanced technology attachment (SATA)), flash memory, or the like. The computer-readable storage 52 provides non-volatile storage of data, data structures, computer-executable instructions, and the like. Although the description of computer-readable media above refers to a HDD, it should be appreciated by those skilled in the art that other types of media that are readable by a computer, such as Zip disks, magnetic cassettes, flash memory cards, cartridges, and the like, may also be used in the exemplary operating environment, and further, that any such media may contain computer-executable instructions for performing novel methods of the disclosed architecture. The computer-readable storage may store data including the network topology data 24 and the SLA data 26.

A number of modules can be stored in the computer-readable storage 52 and in the volatile memory 48, including an operating system 54 and one or more program modules 56, which may implement in whole or in part the functionality described herein. It is to be appreciated that the embodiments can be implemented with various commercially available operating systems 54 or combinations of operating systems 54.

All or a portion of the embodiments may be implemented as a computer program product stored on a transitory or non-transitory computer-usable or computer-readable storage medium, such as the computer-readable storage 52, which includes complex computer-readable programming instructions, such as complex computer-readable program code, configured to cause the processor 40 to carry out the steps described herein. Thus, the computer-readable program code can comprise software instructions for implementing the functionality of the embodiments described herein when executed on the processor 40. The processor 40, in conjunction with the program modules 56 in the volatile memory 48, may serve as a control system, or controller, for the NFL device 20 that is configured to, or adapted to, implement the functionality described herein.

A user, such as an operator, may be able to enter commands and information into the NFL device 20 through one or more input devices, such as, for example, a keyboard (not illustrated), a pointing device such as a mouse (not illustrated), or a touch-sensitive surface (not illustrated). Other input devices may include a microphone, an infrared (IR) remote control, a joystick, a game pad, a stylus pen, or the like. These and other input devices may be connected to the processor 40 through an input device interface 58 that is coupled to the system bus 44, but can be connected by other interfaces such as a parallel port, an Institute of Electrical and Electronic Engineers (IEEE) 1394 serial port, a Universal Serial Bus (USB) port, an IR interface, and the like.

The NFL device 20 also includes a communication interface 60 suitable for communicating with other devices, such as the MEPs 18. The NFL device 20 also includes a video port 62 interfacing with the display 22 that provides information to the operator.

Those skilled in the art will recognize improvements and modifications to the embodiments of the present disclosure. All such improvements and modifications are considered within the scope of the concepts disclosed herein and the claims that follow.

What is claimed is:

1. A method of monitoring a plurality of communication links in a network, comprising:
    receiving, by a device, a plurality of path performance indicators over a period of time;
    determining that at least some of the path performance indicators identify a path violation in a corresponding path of a plurality of paths in the network, each path of the plurality of paths comprising at least one communication link of the plurality of communication links, at least some of the communication links of the plurality of communication links being utilized in multiple paths of the plurality of paths;
    for each path performance indicator that identifies a path violation, updating, by the device, a communication link value associated with each communication link in the corresponding path of the plurality of paths based on a path violation value, at least some of the plurality of paths comprising a plurality of communication links;
    normalizing the communication link value associated with each communication link of the plurality of communication links; and
    identifying, by the device, at least one particular communication link as a problematic communication link based on a comparison between a problematic link criterion and the communication link value associated with the at least one particular communication link.

2. The method of claim 1, further comprising updating a communication link value associated with each communication link not in the corresponding path of the plurality of paths based on a path non-violation value.

3. The method of claim 2, further comprising:
    determining that others of the path performance indicators received over the period of time indicate that no violation occurred in a particular path of the plurality of paths; and
    updating the communication link value associated with each communication link in the network based on the path non-violation value.

4. The method of claim 1, wherein determining that the at least some of the path performance indicators identify the path violation in the corresponding path of the plurality of paths in the network comprises:
    determining, by the device, that the at least some of the path performance indicators identify the path violation based on a path violation criterion.

5. The method of claim 4, wherein the at least some of the path performance indicators comprise results of one or more test packets communicated over corresponding paths, and wherein determining, by the device, that the at least some of the path performance indicators identify the path violation based on the path violation criterion comprises determining, by the device, that the results fail to comply with a service level agreement associated with the corresponding paths.

6. The method of claim 1, wherein determining that the at least some of the path performance indicators identify the path violation in the corresponding path of the plurality of paths in the network comprises receiving, from a different device, information indicating that the at least some of the path performance indicators identify the path violation in the corresponding path of the plurality of paths in the network.

7. The method of claim 6, wherein the different device comprises a measurement endpoint device.

8. The method of claim 6, wherein the different device comprises a proxy network node.

9. The method of claim 1, wherein the communication link values comprise probabilities that corresponding communication links are problematic communication links, respectively.

10. The method of claim 1, wherein the problematic link criterion comprises a threshold value.

11. The method of claim 1, wherein identifying, by the device, the at least one particular communication link as the problematic communication link based on the comparison between the problematic link criterion and the communication link value comprises:

making a determination that a difference between the communication link value associated with the at least one particular communication link and an average communication link value of all other communication link values associated with all communication links other than the at least one particular communication link exceeds a threshold difference; and based on the determination, identifying the at least one particular communication link as the problematic communication link.

12. The method of claim 1, wherein identifying, by the device, the at least one particular communication link as the problematic communication link based on the comparison between the problematic link criterion and the communication link value comprises:

making a determination that a difference between the communication link value associated with the at least one particular communication link and an average communication link value of all communication link values exceeds a threshold difference; and based on the determination, identifying the at least one particular communication link as the problematic communication link.

13. The method of claim 1, further comprising effecting presentation on a display of an identification of the at least one particular communication link with a message indicating the at least one particular communication link is the problematic communication link.

14. The method of claim 13, wherein the message comprises an alert message.

15. The method of claim 1, wherein identifying, by the device, the at least one particular communication link as the problematic communication link based on the comparison between the problematic link criterion and the communication link value comprises:

identifying a plurality of particular communication links of the plurality of communication links as problematic communication links based on comparisons between the problematic link criterion and communication link values associated with the plurality of particular communication links.

16. The method of claim 1, further comprising:

generating a graph based on the communication link values of the plurality of communication links, the graph depicting a relationship between communication links and corresponding communication link values; and effecting presentation of the graph on a display.

17. The method of claim 1, wherein the path violation is based on one of a one-way delay, a round-trip delay, a jitter, a packet loss, an available path capacity, and a service availability.

18. The method of claim 17, wherein data identifying what constitutes the path violation is defined in a service level agreement associated with the network.

19. The method of claim 1, wherein receiving, by the device, the plurality of path performance indicators over the period of time comprises receiving, by the device, the plurality of path performance indicators from a plurality of measurement end points over the period of time.

20. The method of claim 1, wherein each path performance indicator identifies each communication link in the corresponding path.

21. The method of claim 1, wherein each path performance indicator is based on a path measurement of the corresponding path.

22. The method of claim 1, wherein updating, by the device, the communication link value associated with each communication link in the corresponding path of the plurality of paths based on the path violation value further comprises:

updating, by the device, the communication link value associated with each communication link in the corresponding path of the plurality of paths based on the path violation value and on a Gaussian noise value.

23. The method of claim 1, further comprising:

providing, by the device to a plurality of measurement endpoint devices, instructions to perform path measurements over the network; and wherein receiving, by the device, the plurality of path performance indicators is in response to the instructions.

24. A device for monitoring a plurality of communication links in a network, comprising:

a communications interface configured to communicate via the network; and a processor coupled to the communications interface and configured to:

receive a plurality of path performance indicators over a period of time;

determine that at least some of the path performance indicators identify a path violation in a corresponding path of a plurality of paths in the network, each path of the plurality of paths comprising at least one communication link of the plurality of communication links being utilized in multiple paths of the plurality of paths;

for each path performance indicator that identifies a path violation, update a communication link value associated with each communication link in the corresponding path of the plurality of paths based on a path violation value, at least some of the plurality of paths comprising a plurality of communication links;

normalize the communication link values associated with each communication link of the plurality of communication links; and identify at least one particular communication link as a problematic communication link based on a comparison between a problematic link criterion and the communication link value associated with the at least one particular communication link.

25. A method of monitoring a plurality of communication links in a network, each communication link having an associated probability, the method comprising:

initializing each communication link to have a same associated probability;

receiving, by a device, a plurality of path performance indicators over a period of time;

for each received path performance indicator:

determining if the path performance indicator identifies a path violation in a corresponding path of a plurality of paths in the network, each path of the plurality of paths comprising at least one communication link of the plurality of communication links and at least some of the plurality of paths comprising a plurality of communication links, at least some of the communication links of the plurality of communication links being utilized in multiple paths of the plurality of paths;

if the path performance indicator identifies a path violation:

increasing, by the device, the probability associated with each communication link in the corresponding path of the plurality of paths; and decreasing, by the device, the probability associated with each communication link not in the corresponding path of the plurality of paths; and if the path performance indicator does not identify a path violation:
  decreasing, by the device, the probability associated with each communication link in the network;
normalizing the probabilities associated with all the communication links in the network; and
identifying at least one particular communication link as a problematic communication link based on a determination that the probability associated with the at least one particular communication link is higher than a threshold probability.

26. A method of identifying a problematic communication link in a network comprising a plurality of communication links, comprising:
  receiving, by a device, a first path performance indicator that identifies a path violation in a first path of a plurality of paths in the network, the first path comprising a first plurality of communication links, including a first communication link;
  updating a probability associated with each communication link in the first plurality of communication links in response to the first path performance indicator;
  receiving, by the device, a second paths performance indicator that identifies a path violation in a second path of the plurality of paths in the network, the second path comprising a second plurality of communication links, including the first communication link, wherein the first communication link is the only communication link of the plurality of communication links that is in both the first path and the second path;
  updating a probability associated with each communication link in the second plurality of communication links in response to the second path performance indicator;
  normalizing the probabilities associated with all the communication links in the network; and
  identifying the first communication link as a problematic communication link based on a determination that the probability associated with the first communication link is higher than a threshold probability.

* * * * *